United States Patent [19]

Ushikoshi

[11] Patent Number: 5,655,054
[45] Date of Patent: Aug. 5, 1997

[54] MOTOR SPEED DETECTING DEVICE

[75] Inventor: Isao Ushikoshi, Nagano, Japan

[73] Assignee: Kabushiki Kaisha Sankyo Seiki Seisakusho, Nagano, Japan

[21] Appl. No.: 565,225

[22] Filed: Nov. 30, 1995

Related U.S. Application Data

[63] Continuation of Ser. No. 153,039, Nov. 17, 1993.

[30] Foreign Application Priority Data

Nov. 17, 1992 [JP] Japan ..................... 4-331002
[51] Int. Cl.$^6$ ........................................ G05F 1/10
[52] U.S. Cl. ................ 388/815; 388/814; 388/908; 388/813
[58] Field of Search .................. 388/800, 803–808, 388/809–815, 816–823, 968, 915, 928.1; 318/461–465, 449–450, 798–811, 606–608, 254, 138, 439

[56] References Cited

U.S. PATENT DOCUMENTS 3,987,350 10/1976 Pomella et al. ................ 318/571
3,992,657 11/1976 Akamatsu .
4,114,075 9/1978 Minakuchi .
4,158,801 6/1979 Hirata ................................ 318/801
4,338,558 7/1982 Okamatsu ........................... 318/802
4,498,034 2/1985 Shirakawa .
4,773,616 9/1988 Abe ................................... 318/7 X

*Primary Examiner*—David S. Martin
*Attorney, Agent, or Firm*—Sughrue, Mion, Zinn, Macpeak & Seas

[57] ABSTRACT

A device for detecting the speed of a plural-phase motor in which a speed deviation occurring every m periods is eliminated, to provide a speed detection signal high in accuracy at low cost. The motor speed detecting device in which, among drive signals driving a plural-phase motor, m-phase drive signals (where m is a natural number which is not less than two (2) and equal to or smaller than the number of phases of said motor) are detected, and combined to form a signal, comprises a frequency divider adapted to subject the signal thus formed to $1/(m \times n)$ frequency division (where n is a natural number).

7 Claims, 4 Drawing Sheets

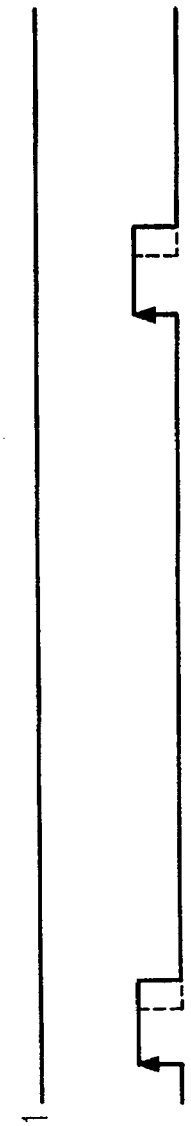
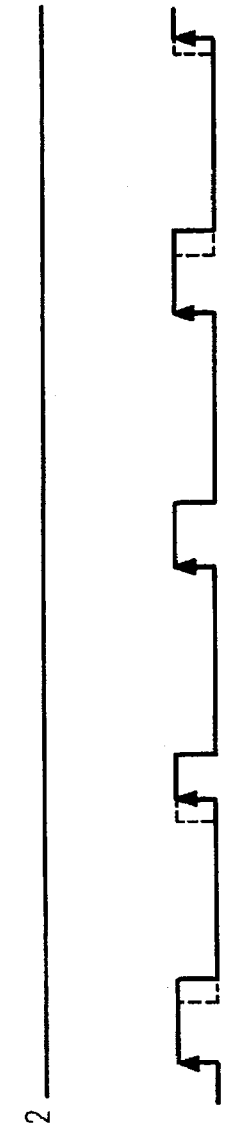
FIG. 2(a) 1/3 FREQUENCY DIVIDED SIGNAL g1
FIG. 2(b) SPEED DEVIATION ef1
FIG. 2(c) 1/6 FREQUENCY DIVIDED SIGNAL g2
FIG. 2(d) SPEED DEVIATION ef2
FIG. 2(e) 1/2 FREQUENCY DIVIDED SIGNAL g3
FIG. 2(f) SPEED DEVIATION ef3

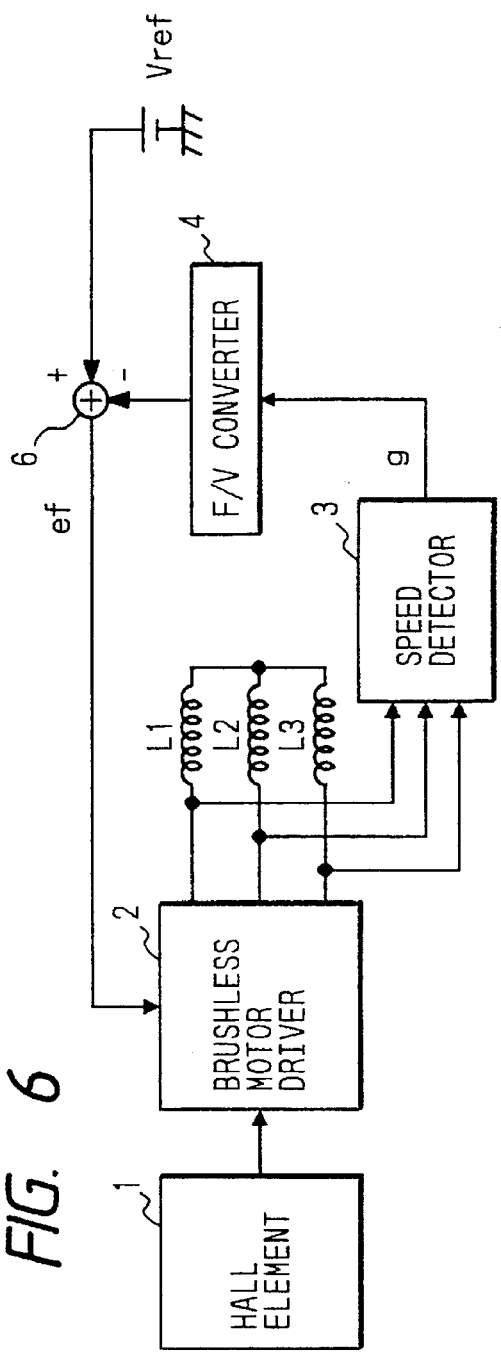
FIG. 6
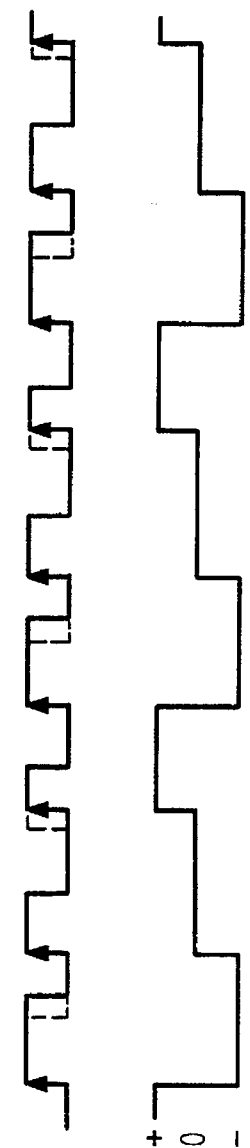
FIG. 7(a) SPEEDING DETECTING SIGNAL g
FIG. 7(b) SPEED DEVIATION ef 5,655,054

1

MOTOR SPEED DETECTING DEVICE

This is a continuation of application Ser. No. 08/153,039 filed Nov. 17, 1993.

BACKGROUND OF THE INVENTION

1. Field of the Invention

This invention relates to motor speed detecting devices, and more particularly to a device for detecting a speed of a brushless motor of at least two phases.

2. Related Art

A speed detecting device for a three-phase brushless motor as shown in FIG. 6 is known in the art. The brushless motor includes: a stator having drive coils L1, L2 and L3; and a rotor with magnetic poles. The rotor is rotated as follows: That is, a Hall element 1 applies three-phase sine wave signals to a brushless motor driver 2 in correspondence to the relative position of the stator and the rotor. In the brushless motor driver 2, the signals thus applied are suitably processed, so that currents are applied to the drive coils L1, L2 and L3, whereby the rotor is rotated.

On the other hand, the speed of the brushless motor is detected as follows: The coil terminal signals of the drive coils L1, L2 and L3 are detected by a speed detector 3, and the signals thus detected are combined to form a square wave signal for detection of the speed of the motor. The square wave signal thus formed is subjected to F/V (frequency-to-voltage) conversion by an F/V converter 4. The output of the F/V converter 4 is applied to an adder 6, where it is added to a speed reference voltage Vref. The output of the adder; i.e., the sum of those voltages is fed back to the brushless motor driver 2, to control the speed of the brushless motor.

The above-described speed detecting device suffers from the following difficulties:

In the case where the voltages of the phases are shifted by the counter electromotive force in the motor, or the detector employed in the speed detecting device is low in the accuracy of detection, the waveform of the output signal g of the speed detector 3 is shifted from that which, as indicated by the dotted lines in FIG. 7(a), is provided when it is high in the accuracy of detection; that is, the signal is deviated as indicated by a speed deviation ef provided by the adder 6 as shown in FIG. 7(b). This deviation can be eliminated by increasing the accuracy of the detector or the motor; however, the method is not practical, because it will increase the manufacturing costs of them.

SUMMARY OF THE INVENTION

In view of the foregoing, an object of this invention is to provide a motor speed detecting device high in accuracy at low manufacturing cost.

The foregoing object of the invention has been achieved by the provision of a motor speed detecting device in which, among drive signals driving a plural-phase motor, m-phase drive signals (where m is a natural number which is not less than two (2) and equal to or smaller than the number of phases of said motor) are detected, and combined to form a signal; which, according to the invention, comprises:

a frequency divider for subjecting the signal thus formed to 1/(m×n) frequency division (where n is a natural number).

With the motor speed detecting device of the invention, the frequency divider adapted to subject to 1/(m×n) frequency division the signal which is formed through detection of drive signals of the motor operates to eliminate a speed deviation which occurs every m periods.

BRIEF DESCRIPTION OF THE DRAWINGS

FIG. 2(a) to (f) are waveform diagrams for a description of frequency division waveform signals and speed deviations in the device of the invention;

FIG. 6 is a block diagram outlining the arrangement of a conventional motor speed detecting device; and FIG. 7(a) and (b) are waveform diagrams for a description of a speed detection signal and a speed deviation in the conventional device.

DETAILED DESCRIPTION OF THE PREFERRED EMBODIMENTS

Preferred embodiments of this invention will be described with reference to the accompanying drawings.

Figure 1:
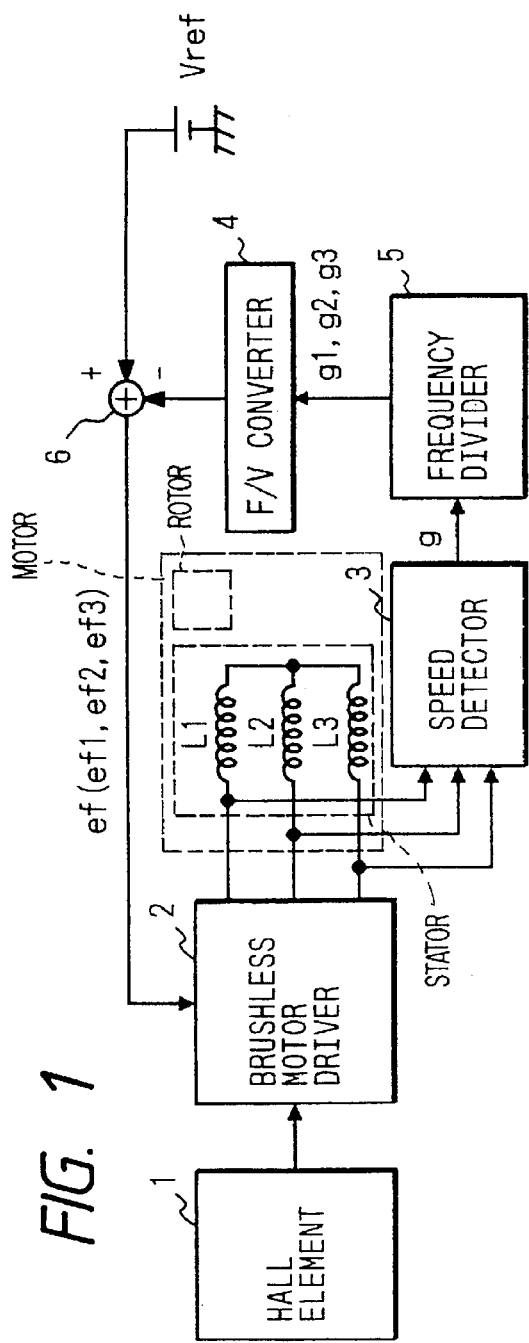
FIG. 1 is a block diagram outlining the arrangement of one example of a motor speed detecting device, which constitutes a first embodiment of this invention.

FIG. 1 is a block diagram outlining the arrangement of one example of a three-phase brushless motor speed detecting device, which constitutes a first embodiment of the invention. In FIG. 1, reference numeral 1 designates a Hall element; L1, L2 and L3, drive coils; 2, a brushless motor driver; 3, a speed detector; 4, an F/V converter; 6, an adder, and Vref, a speed reference voltage. The parts corresponding functionally to those which have been described with the reference to conventional device are designated by the same reference numerals or characters.

The brushless motor speed detecting device of the invention may be such that three of the phase driving signals driving the three-phase motor are detected by the speed detector 3 and combined to form a speed detection signal g. A frequency divider 5 is adapted to perform ⅓ frequency division on speed detection signal g outputted by the speed detector 3.

It is assumed that, in order to form the speed detection signal g, it is necessary for the brushless motor to use m phase driving signals among signals driving a plural-phase motor; (where m is a natural number which is not less than two and equal to or smaller than the number of phase driving signals of a motor). In this case, the speed detection signal g includes a signal component every m periods which is shifted from a reference speed. In the embodiment, the brushless motor is of m (=3) phase; that is, signals driving the 3-phase brushless motor are detected. Therefore, the speed detection signal g includes a signal component every three periods which is shifted from the reference speed, as shown in FIG. 7.

The output signal g of the speed detector 3 is applied to the frequency divider 5, where it is subjected to ⅓ frequency division. As a result, a frequency-divided signal g1 as shown in FIG. 2(a) is obtained, and a deviation component occurring every three period is removed from a speed deviation ef1, as shown in FIG. 2(b), which is provided by the adder 6. That is, the resultant speed detection signal is high in accuracy.

In the above-described embodiment, the frequency divider 5 is of ⅓ frequency division; however, it may be replaced by a ⅙ frequency divider the denominator of which is twice as large as that of the ⅓ frequency divider, being the product of two (2) and the number "three (3)" of the three periods. In this case, a frequency-divided signal g2 as shown in FIG. 2(c) is obtained, and, similarly as in the case where the ⅓ frequency divider is employed, deviation components are removed from a speed deviation ef2, as shown in FIG. 2(d) provided by the adder 6.

Furthermore, the frequency divider may be a ⅑ frequency divider the denominator of which is three times as large as that of the ⅓ frequency divider, being the product of three (3) and the number "three (3)" of the three periods. In this case, too, deviation components are similarly removed from the speed deviation provided by the adder 6.

If summarized, in the speed detecting device of the invention, three-phase drive signals driving a three-phase brushless motor are detected and combined to form the speed detection signal, and the frequency divider 5 adapted to subject the speed detection signal to 1/(3×n) frequency division (where n is a natural number) is employed to remove the deviation components from the speed deviation ef provided by the adder 6, whereby the resultant speed detection signal is high in accuracy.

In the above-described embodiment, it should be noted that the brushless motor is rotated at a constant speed.

Let us consider the case where the frequency divider is a ½ frequency divider the denominator of which is not the product of a natural number and the number "three (3)" of the three periods. In this case, the frequency-divided signal is as indicated at g3 in FIG. 2(e). As is seen from the signal g3, no deviations components are removed from a speed deviation ef3, as shown in FIG. 2(f), provided by the adder 6.

On the other hand, the speed detecting device may be such that two of the phase driving signals driving the three-phase brushless motor are detected and combined to form a speed detection signal q. In this case, the speed detection signal g includes a signal component every two periods which is shifted from the reference speed. Hence, the deviation components can be removed from the speed deviation ef provided by the adder 6 by employing a 1/(2×n) frequency divider (where n is a natural number) as the frequency divider 5, and therefore the resultant speed detection signal is high in accuracy.

As is apparent from the above description, if it is assumed the number of coils of the brushless motor which is required to form the speed detection signal g is n, then the speed detection signal includes a signal component every m periods which is shifted from the reference speed (where m is a natural number which is not less than two (2) and equal to or smaller than the number of phases of the motor). Hence, a speed detection signal high in accuracy can be obtained by employing a frequency divider (5) which is adapted to subject a signal to 1/(m×n) frequency division (where n is a natural number).

Figure 3:
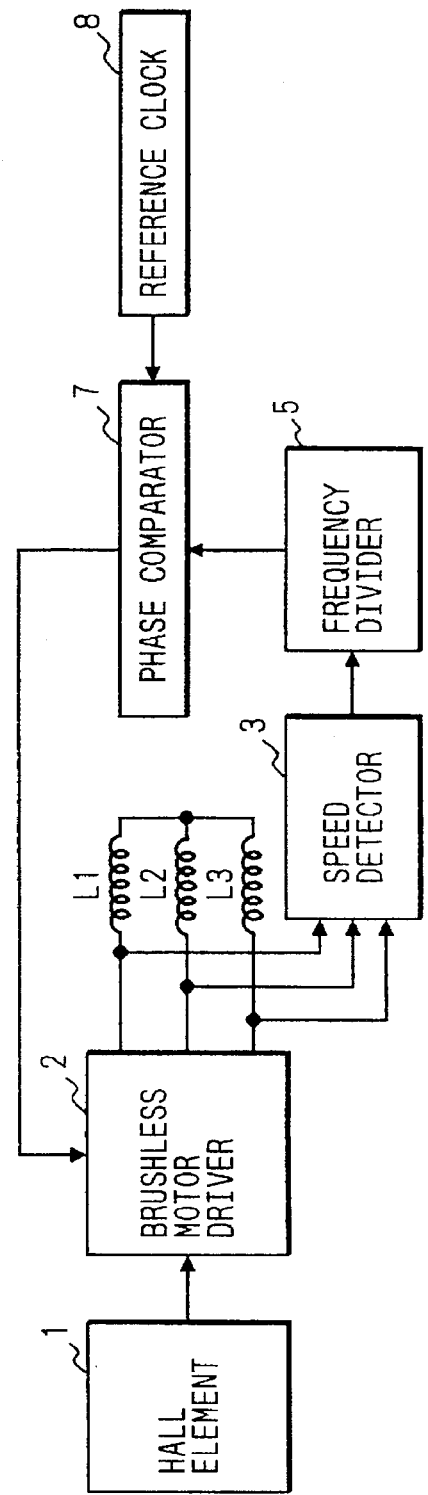
FIG. 3 is a block diagram outlining the arrangement of another example of the motor speed detecting device, which constitutes a second embodiment of the invention.

FIG. 3 is a block diagram outlining another example of the three-phase brushless motor speed detecting device, which constitutes a second embodiment of the invention, in which parts corresponding functionally to those which have been described with reference to FIG. 1 are therefore designated by the same reference numerals or characters.

The second embodiment is different from the first embodiment as follows: In the first embodiment, the output signal of the F/V converter 4 is applied to the adder 6, where it is added to the speed reference voltage Vref; whereas in the second embodiment, the output signal of the frequency divider is subjected to comparison in a phase comparator 7 which receives a signal from a reference clock means 8. It is ensured that the second embodiment thus organized has the same effects as the first embodiment.

Figure 4:
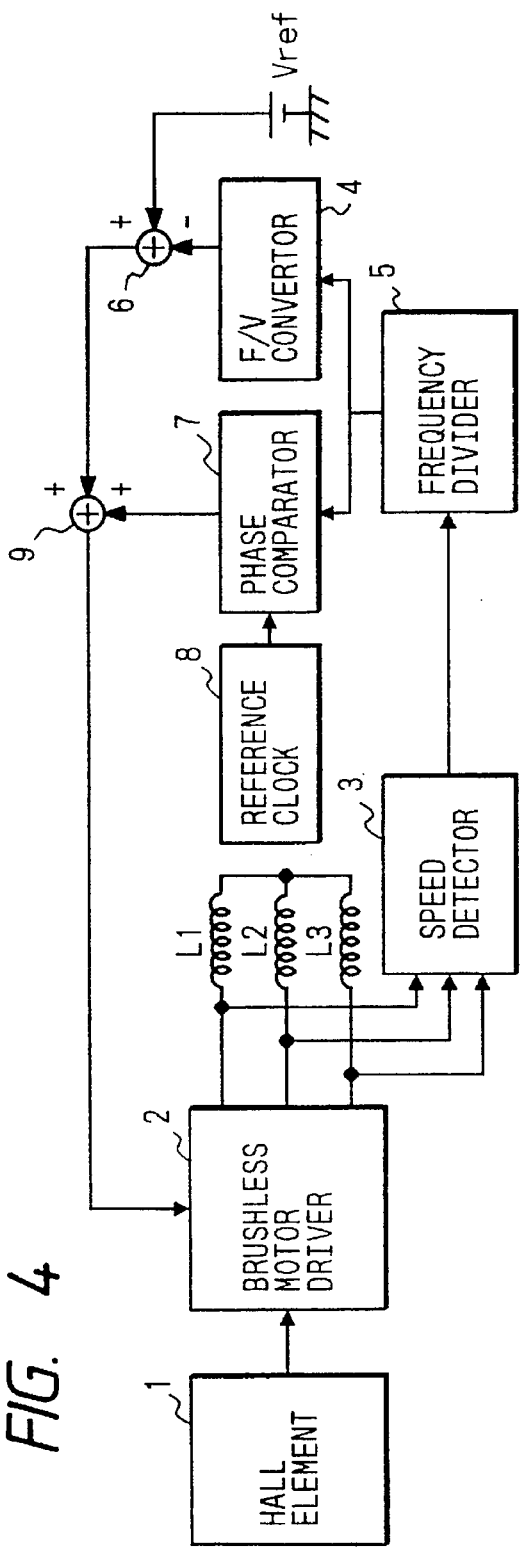
FIG. 4 is a block diagram outlining the arrangement of another example of the motor speed detecting device, which constitutes a third embodiment of the invention.
Figure 5:
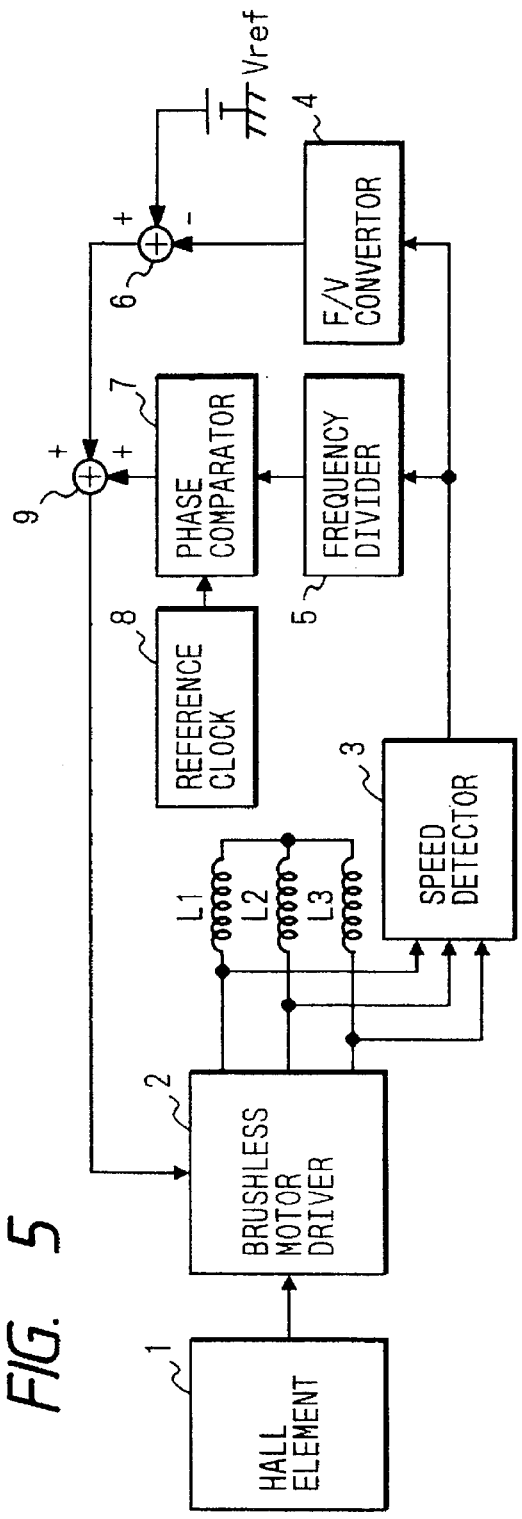
FIG. 5 is a block diagram outlining the arrangement of another example of the motor speed detecting device, which constitutes a fourth embodiment of the invention.

FIGS. 4 and 5 are block diagrams outlining the arrangements of third and fourth examples of the three-phase brushless motor speed detecting device, which constitute third and fourth embodiments of the invention, respectively. The third and fourth embodiments are different from the first and second embodiments as follows: In the third embodiment, the output signal of the frequency divider 5 is applied to the F/V converter 4 (of the first embodiment) and to the phase comparator 7 (of the second embodiment), and the output signals of the F/V converter 4 and the phase comparator 7 are applied to adders 6 and 9, respectively. The fourth embodiment is obtained by modifying the third embodiment in such a manner that the frequency divider 5 is provided only for the phase comparator 7. It is ensured that those embodiments have the same effects as the second embodiment. In addition, the device is stable in operation having the phase comparator 7.

As is apparent from the above-described embodiments, a brushless motor speed detecting device of the invention in which, among drive signals driving a plural-phase motor, m-phase drive signals (where m is a natural number which is not less than two (2) and equal to or smaller than the number of phases of the motor) are detected, and combined to form a speed detection signal, includes a frequency divider for subjecting the speed detection signal to 1/(m×n) frequency division (where n is a natural number), so that the resultant speed detection signal is high in accuracy. However, if the frequency division ratio is increased, then the control gain is decreased, thus making the speed of the motor unstable. Hence, it is essential that the frequency division ratio is so determined that it may not adversely affect the speed stability.

While a few embodiments of the invention have been concretely described, the invention is not limited thereto or thereby; that is, various changes and modifications may be made therein without departing from the invention. For instance, in the above-described embodiments, the coil terminal signals of the drive coils L1, L2 and L3 are utilized for detection of the speed of the motor; however, the detection may be achieved by using the output signal of the Hall element.

Furthermore, the preferred embodiments have been described with reference to the brushless motor; however, it should be noted that the invention is not limited thereto or thereby. That is, the technical concept of the invention is applicable to other motors such as linear motors.

As was described above, in the motor speed detecting device of the invention, the frequency divider adapted to subject to 1/(m×n) frequency division the signal which is formed through detection of the drive signals of the motor operates to remove a speed deviation which occurs every m periods (where n is a natural number). Therefore, the device is able to provide a speed detection signal high in accuracy at low cost.

What is claimed is:

1. A motor speed detecting device for detecting a speed of a plural-phase motor which includes a stator having a plurality of drive coils and a rotor with magnetic poles, said detecting device comprising:

a Hall element for generating sine waves in correspondence to a relative position of the stator and rotor;

a motor driver for applying current to the drive coils in accordance with the sine waves;

a speed detector for detecting m phase driving signals among a plurality of phase driving signals driving said motor to form a signal; and a means for eliminating a speed deviation occurring every m periods in the signal;

said speed deviation eliminating means including a frequency divider for receiving the signal from the speed detector and for outputting a frequency divided signal having a frequency which is 1/(m×n) times the frequency of the signal received from the speed detector, where m is not less than two and is not more than the number of said plurality of phase driving signals driving said motor, and m and n are natural numbers.

2. A motor speed detecting device as claimed in claim 1, wherein said speed deviation eliminating means further includes a frequency-to-voltage convertor for converting the frequency of the frequency divided signal to a voltage signal; and an adder for adding the voltage signal from the frequency-to-voltage convertor to a speed reference signal voltage and for feeding the sum to the motor driver so as to control the speed of the motor.

3. A motor speed detecting device as claimed in claim 1, wherein said speed deviation eliminating means further includes a phase comparator for comparing the frequency of the frequency divided signal with a frequency of a reference clock so as to control the speed of the motor.

4. A motor speed detecting device as claimed in claim 1, wherein said speed deviation eliminating means further includes a frequency-to-voltage convertor for converting the frequency of the frequency divided signal to a voltage signal;

a first adder for adding the voltage signal from the frequency-to-voltage convertor to a speed reference voltage;

a phase comparator for comparing the frequency of the frequency divided signal with a frequency of a reference clock; and a second adder for adding an output of the first adder and an output of the phase comparator and for feeding a sum to the motor driver so as to control the motor driver.

5. A motor speed detecting device as claimed in claim 1, wherein said speed deviation eliminating means further includes a frequency-to-voltage convertor for converting the frequency of the signal output from the speed detector to a voltage signal;

a first adder for adding the voltage signal from the frequency-to-voltage convertor to a speed reference voltage;

a phase comparator for comparing the frequency divided signal with a frequency of a reference clock; and a second adder for adding an output of the first adder and an output of the phase comparator and for feeding a sum of the outputs of the first adder and the phase comparator to the motor driver so as to control the motor driver.

6. A motor speed detecting device for detecting a speed of a motor which includes a stator having a plurality of drive coils and a rotor with magnetic poles, said detecting device comprising:

a Hall element for generating sine waves in correspondence to a relative position of the stator and rotor;

a motor driver for applying current to the drive coils in accordance with the sine waves;

a speed detector for detecting at least two phase signals of the drive coils to form a signal;

a frequency divider for receiving the signal from the speed detector and outputting a frequency divided signal having a frequency which is 1/(m×n) times the frequency of the signal received from the speed detector, where m is not less than two and is not more than the number of phases of the drive coils, and m and n are natural numbers;

a frequency-to-voltage convertor for converting the frequency of the frequency divided signal to a voltage signal;

a first adder for adding the voltage signal from the frequency-to-voltage convertor to a speed reference voltage;

a phase comparator for comparing the frequency of the frequency divided signal with a frequency of a reference clock; and a second adder for adding an output of the first adder and an output of the phase comparator and for feeding a sum to the motor driver so as to control the motor driver.

7. A motor speed detecting device for detecting a speed of a motor which includes a stator having a plurality of drive coils and a rotor with magnetic poles, said detecting device comprising:

a Hall element for generating sine waves in correspondence to a relative position of the stator and rotor;

a motor driver for applying current to the drive coils in accordance with the sine waves;

a speed detector for detecting at least two phase signals of the drive coils to form a signal;

a frequency divider for receiving the signal from the speed detector and outputting a frequency divided signal having a frequency which is 1/(m×n) times the frequency of the signal received from the speed detector, where m is not less than two and is not more than the number of phases of the drive coils, and m and n are natural numbers;

a frequency-to-voltage convertor for converting the frequency of the signal output from the speed detector to a voltage signal;

a first adder for adding the voltage signal from the frequency-to-voltage convertor to a speed reference voltage;

a phase comparator for comparing the frequency divided signal with a frequency of a reference clock; and a second adder for adding an output of the first adder and an output of the phase comparator and for feeding a sum of the outputs of the first adder and the phase comparator to the motor driver so as to control the motor driver.

* * * * *